US012058800B2

(12) United States Patent
Park et al.

(10) Patent No.: US 12,058,800 B2
(45) Date of Patent: Aug. 6, 2024

(54) CNT X-RAY TUBE CONTROL SYSTEM WITH DUMMY LOAD

(71) Applicant: NANORAY CO., LTD., Daegu (KR)

(72) Inventors: Jae Yun Park, Gyeonggi-do (KR); Dong Hwan Kim, Gyeonggi-do (KR); Young Hyun Choi, Gyeongsangbuk-do (KR)

(73) Assignee: NANORAY CO., LTD., Daegu (KR)

( * ) Notice: Subject to any disclaimer, the term of this patent is extended or adjusted under 35 U.S.C. 154(b) by 0 days.

(21) Appl. No.: 17/863,538

(22) Filed: Jul. 13, 2022

(65) Prior Publication Data

US 2023/0300964 A1 Sep. 21, 2023

(30) Foreign Application Priority Data

Mar. 18, 2022 (KR) ........................ 10-2022-0034085

(51) Int. Cl.

*H05G 1/70* (2006.01)
*H01J 35/06* (2006.01)
*H05G 1/32* (2006.01)
*H05G 1/56* (2006.01)

(52) U.S. Cl.

CPC ................. *H05G 1/70* (2013.01); *H05G 1/32* (2013.01); *H05G 1/56* (2013.01); *H01J 35/065* (2013.01)

(58) Field of Classification Search

CPC .... H05G 1/70; H05G 1/32; H05G 1/56; H01J 35/065

See application file for complete search history.

(56) References Cited

U.S. PATENT DOCUMENTS

2009/0022264 A1* 1/2009 Zhou ...................... A61B 6/025 378/5

FOREIGN PATENT DOCUMENTS

| | | | |
|---|---|---|---|
| KR | 10-2005-0066586 | A | 6/2005 |
| KR | 10-2015-0088568 | A | 8/2015 |
| KR | 10-2017-0134144 | A | 12/2017 |
| KR | 10-1916711 | B1 | 1/2019 |

OTHER PUBLICATIONS

Kuwata et al., JP 11-304734 A, (1999), with English translation. (Year: 1999).*

Office action issued on Apr. 21, 2023 from Korean Patent Office in a counterpart Korean Patent Application No. 10-2022-0034085 (all the cited references are listed in this IDS.) (English translation is also submitted herewith.).

* cited by examiner

*Primary Examiner* — Chih-Cheng Kao

(74) *Attorney, Agent, or Firm* — The PL Law Group, PLLC

(57) ABSTRACT

A CNT X-ray tube control system according to an embodiment of the present disclosure includes a CNT X-ray tube including an anode electrode, a gate electrode, and a cathode electrode, and configured to generate X-rays from electric field emission; a dummy load including an anode electrode, a gate electrode, and a cathode electrode, and configured not to generate X-rays, the dummy load being connected to the CNT X-ray tube in parallel; a high-voltage part configured to control a voltage applied to the CNT X-ray tube; and a controller configured to control the CNT X-ray tube, the dummy load, and the high-voltage part. Particularly, a portable X-ray generation apparatus reduced in size can be provided, the apparatus including the dummy load having the same structure as a CNT to minimize the voltage (Continued)

variation of the high-voltage part during the ON/OFF operation of the CNT.

5 Claims, 5 Drawing Sheets

CNT X-RAY TUBE CONTROL SYSTEM WITH DUMMY LOAD

CROSS REFERENCE TO RELATED APPLICATION AND CLAIM OF PRIORITY

This application claims the benefit under 35 USC § 119 of Korean Patent Application No. 10-2022-0034085, filed on Mar. 18, 2022, in the Korean Intellectual Property Office, the entire disclosure of which is incorporated herein by reference for all purposes.

BACKGROUND

1. Field of the Invention

The present disclosure relates to a CNT X-ray tube control system with a dummy load. Particularly, the present disclosure relates to providing a portable X-ray generation apparatus reduced in size, the apparatus including a dummy load having the same structure as a CNT to minimize voltage variation of a high-voltage part during the ON/OFF operation of the CNT.

2. Description of the Related Art

Recently, X-ray imaging has been rapidly replaced with digital radiography (DR) using digital sensors due to the development of semiconductor and information processing technologies, and X-ray imaging technology has also been developed in various ways according to the purpose.

For example, there is intra-oral X-ray imaging mainly used in dentistry. Intra-oral X-ray imaging is an X-ray imaging technology for obtaining an X-ray image of a limited area in a subject's mouth, and is performed as follows: an X-ray sensor is placed inside the subject's mouth, an X-ray generation device outside the mouth emits X-rays, and X-ray images of the tooth therebetween and surrounding tissue are obtained. The intra-oral X-ray image has advantages of low distortion, excellent resolution and sharpness, and relatively low radiation exposure, so it is mainly used for implant treatment or endodontic treatment requiring high resolution.

Meanwhile, an X-ray imaging device for intra-oral X-ray imaging is generally called a portable X-ray generation device, and X-ray imaging is often performed by a user holding the device. In order to improve the convenience and accuracy of intra-oral X-ray imaging and to improve the utilization thereof, it is required to reduce the X-ray generation device in weight and size.

In the case of a portable X-ray generation device for dental purposes, guidelines are needed to ensure safety from radiation. This is because the hand of a person who captures an image while holding the device in the hand is likely to be exposed to radiation that leaks while a subject is imaged, and because the body of the person is likely to be exposed to radiation scattered from the subject.

Several study results have shown that radiation dose of a person who captures an image by using a portable X-ray generation device for dental purposes is below an annual maximum permissible dose for radiation workers. However, radiation exposure of the person must be reduced using appropriate radiation protection equipment according to the defense optimization principle that radiation exposure should be kept as low as reasonably achievable (ALARA) considering economic and social factors.

Recently, to reduce the X-ray generation device in size, research on an electric field emission X-ray source using a nanostructure such as a carbon nanotube (CNT), has been conducted. The X-ray source using the carbon nanotube is an electric field emission type, and different from a conventional hot-cathode X-ray source device based on a tungsten filament in its electron emission mechanism. The carbon nanotube-based X-ray source is capable of emitting electrons with relatively low power, and the electrons are emitted along the length of the carbon nanotube, so that X-ray emission efficiency is very high because of excellent directivity of electrons toward an X-ray target surface at an anode electrode. In addition, it is easy to emit X-rays in the form of a pulse and it is possible to take an X-ray video, whereby it is very likely to be used for dental diagnosis, especially intra-oral X-ray imaging.

A conventional field emission X-ray source includes an electron emitter provided on a cathode electrode in a vacuum container, and a gate electrode provided adjacent to the electron emitter, wherein electrons are emitted by an electric field formed between the gate electrode and the electron emitter. The gate electrode is in the shape of a mesh or a metal plate in which a plurality of holes are arranged according to an array of the electron emitter. When the electron beams emitted from the electron emitter travels through this mesh structure or the plurality of holes, the electrons are accelerated by an electric field formed between the anode and the cathode so as to strike an X-ray target surface provided on the anode size so that X-rays are emitted. In addition, a focusing electrode is provided around the electron beam traveling path between the cathode and the anode to form an electric field for focusing the electron beams.

The electric field emission X-ray source is advantageous in reducing the X-ray generation device in size and weight. However, in a small-sized device, a high potential difference of about several tens of kV is formed between the anode and the cathode, so the device is susceptible to a risk of dielectric breakdown. In order to increase insulation stability, an insulation distance may be increased or an insulating structure may be added, but this may result in the opposite to reduction in size and weight.

The foregoing is intended merely to aid in the understanding of the background of the present disclosure, and is not intended to mean that the present disclosure falls within the purview of the related art that is already known to those skilled in the art.

SUMMARY

The present disclosure is directed to providing a portable X-ray generation apparatus reduced in size, the apparatus including a dummy load having the same structure as a CNT to minimize voltage variation of a high-voltage part during the ON/OFF operation of the CNT.

According to the present disclosure, there is provided a CNT X-ray tube control system with a dummy load, the system including: a CNT X-ray tube including an anode electrode, a gate electrode, and a cathode electrode, and configured to generate X-rays from electric field emission; the dummy load including an anode electrode, a gate electrode, and a cathode electrode, and not configured to generate X-rays, the dummy load being connected to the CNT X-ray tube in parallel; a high-voltage part configured to control a voltage applied to the CNT X-ray tube; and a controller configured to control the CNT X-ray tube, the dummy load, and the high-voltage part.

Herein, particularly, an ON/OFF operation of the CNT X-ray tube and an ON/OFF operation of the dummy load may be performed complementarily to each other.

Herein, particularly, the system may further include: a first current controller connected to the cathode electrode of the CNT X-ray tube, and configured to control a current applied to the cathode electrode of the CNT X-ray tube; and a second current controller connected to the cathode electrode of the dummy load, and configured to control a current applied to the cathode electrode of the dummy load.

Herein, particularly, the first current controller and the second current controller may be configured to control the currents using an active-current control method.

Herein, particularly, a plurality of the CNT X-ray tubes may be provided, and the plurality of the CNT X-ray tubes and the dummy load may be connected in parallel.

Herein, particularly, the controller may be configured to generate a switching operating frequency of the plurality of the CNT X-ray tubes and the dummy load, and generate a switching PWM ratio.

Herein, particularly, the controller may be configured to divide switching time of the CNT X-ray tubes when the plurality of the CNT X-ray tubes are provided.

According to the present disclosure, a portable X-ray generation apparatus reduced in size can be provided, the apparatus including the dummy load having the same structure as a CNT to minimize the voltage variation of the high-voltage part during the ON/OFF operation of the CNT.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
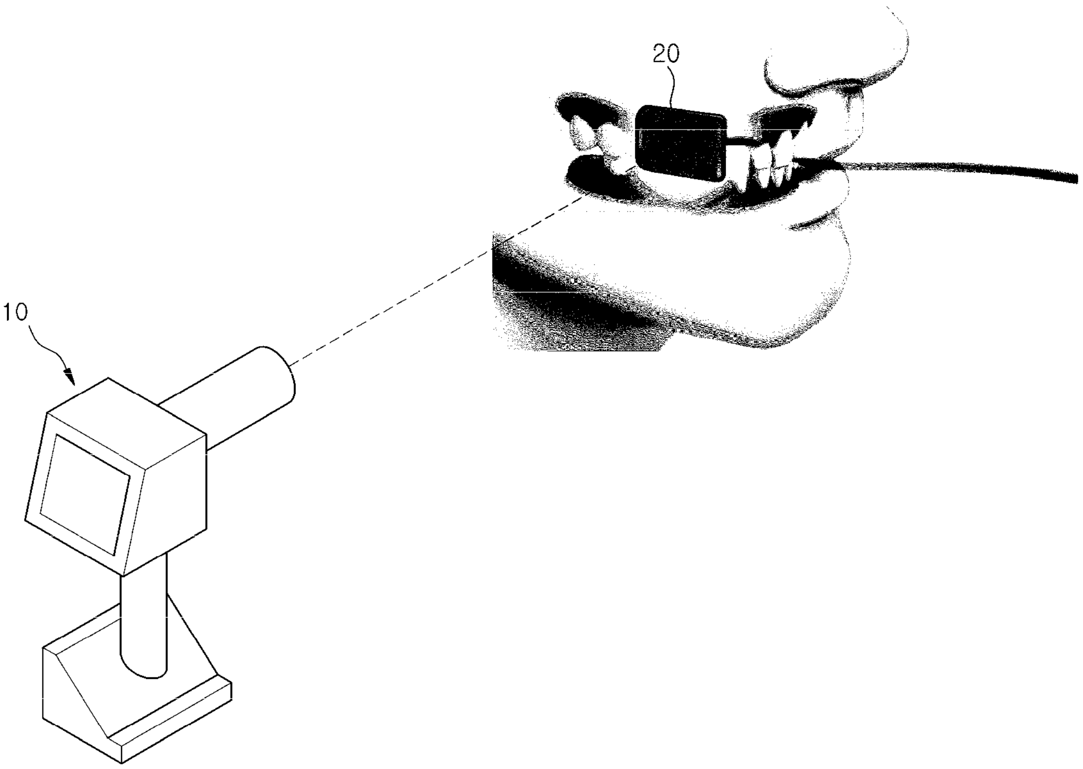
FIG. 1 is a view showing an example of the use of a portable X-ray apparatus including a CNT X-ray tube control system with a dummy load according to an embodiment of the present disclosure.

The present disclosure may be modified in various ways and implemented by various embodiments, so that specific embodiments are shown in the drawings and will be described in detail. However, the present disclosure is not limited to the embodiments, and the embodiments can be construed as including all modifications, equivalents, or substitutes in a technical concept and a technical scope of the present disclosure.

In describing the present disclosure, if it is decided that a detailed description of the known art related to the present disclosure makes the subject matter of the present disclosure unclear, the detailed description will be omitted. In addition, numbers (e.g., first, second, etc.) used for the description of the present disclosure are identification symbols for distinguishing one element from another element.

In addition, in the present disclosure, when an element is referred to as being "coupled" or "connected" to another element, it can be directly coupled or connected to the other element, or intervening elements may be present therebetween, unless specifically stated otherwise.

Hereinafter, exemplary embodiments of the present disclosure will be described in detail with reference to the accompanying drawings.

FIG. 1 is a view showing an example of the use of a portable X-ray apparatus including a CNT X-ray tube control system with a dummy load according to an embodiment of the present disclosure.

Figure 2:
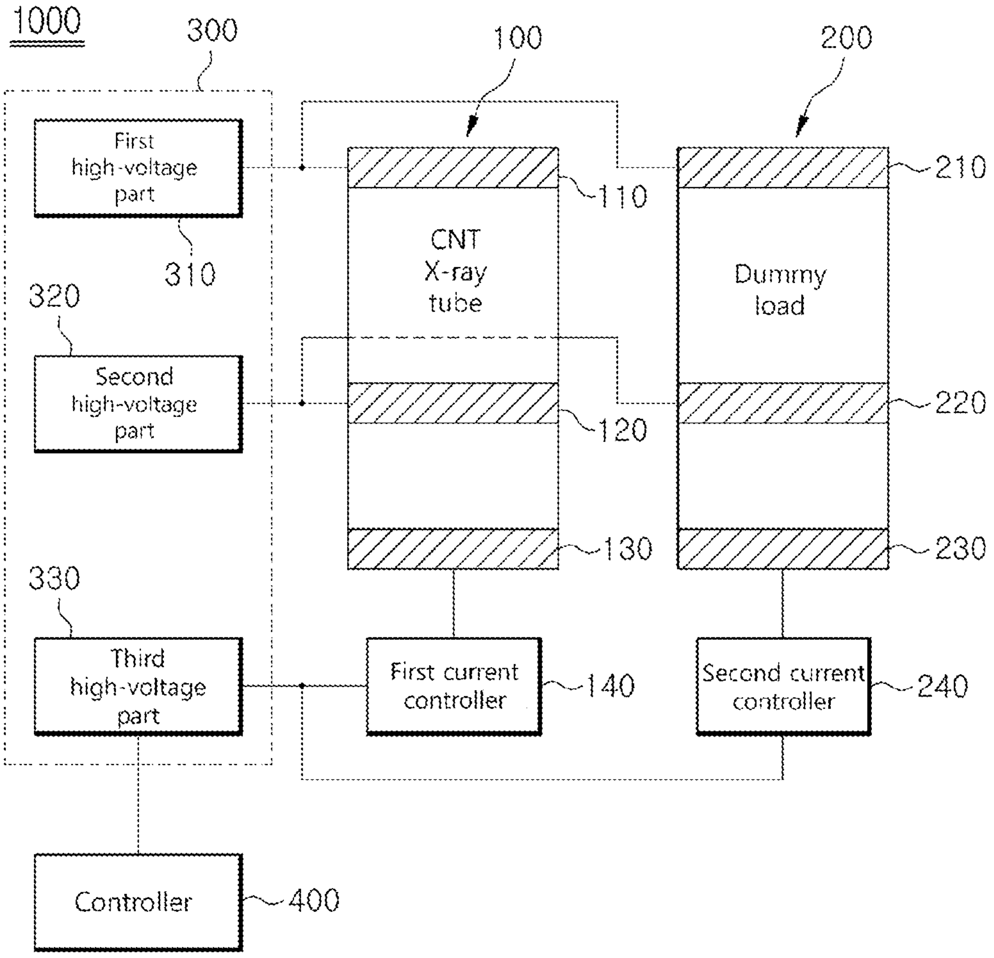
FIG. 2 is a view showing a configuration of a CNT X-ray tube control system with a dummy load according to an embodiment of the present disclosure.

FIG. 2 is a view showing a configuration of a CNT X-ray tube control system with a dummy load according to an embodiment of the present disclosure.

Figure 3:
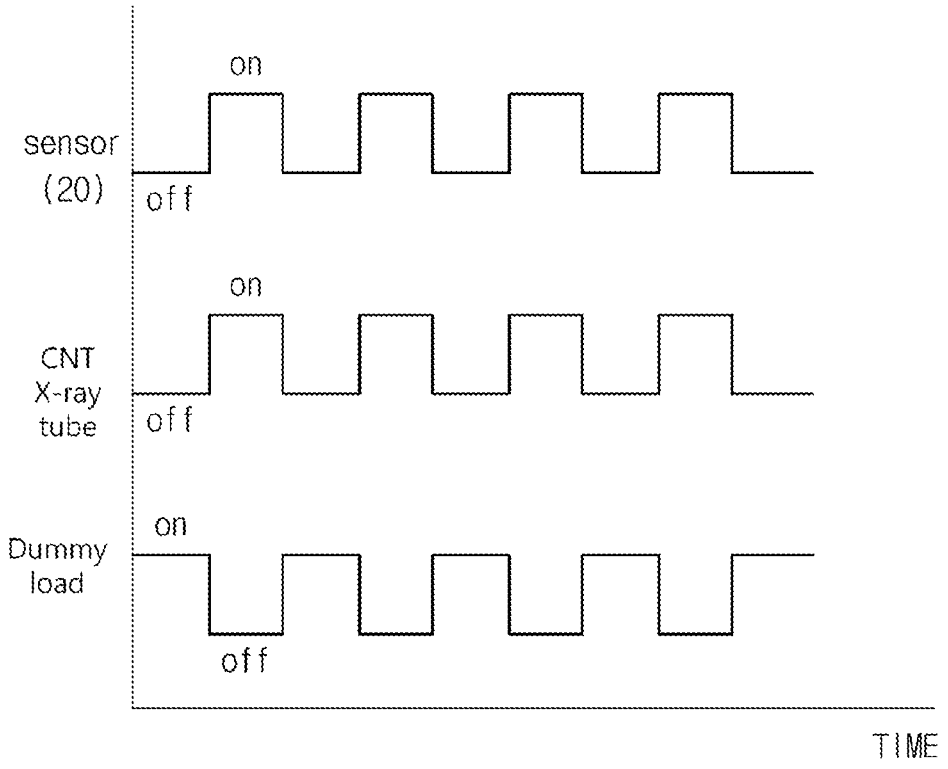
FIG. 3 is a view showing an operation time table of the CNT X-ray tube control system with the dummy load of FIG. 2.

FIG. 3 is a view showing an operation time table of the CNT X-ray tube control system with the dummy load of FIG. 2.

Figure 4:
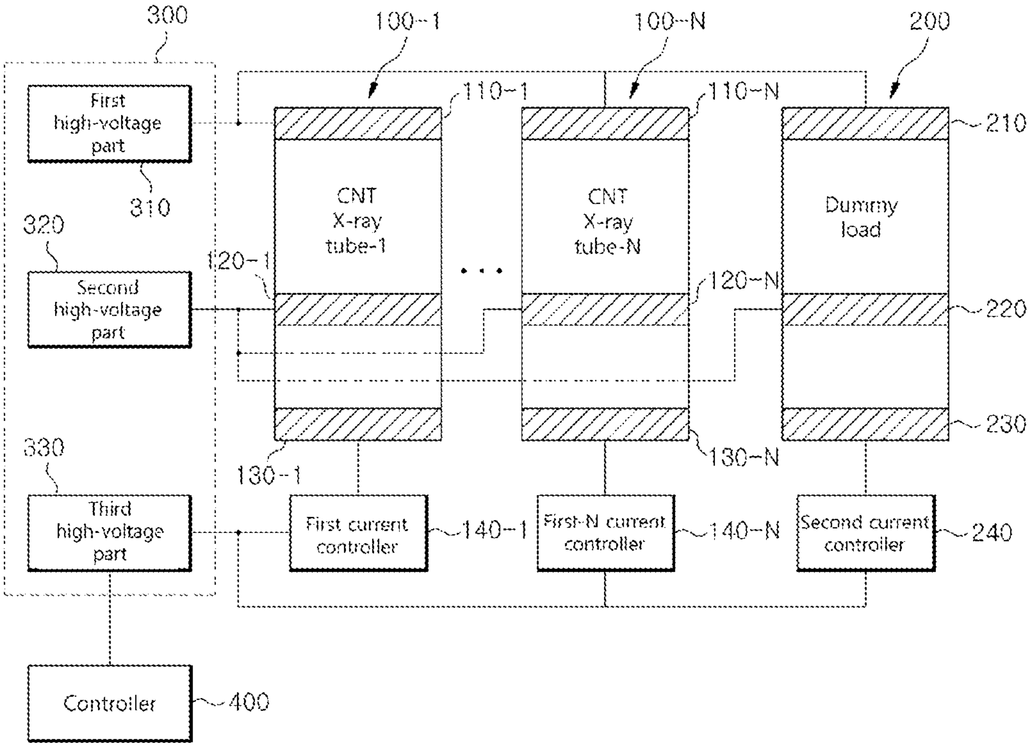
FIG. 4 is a view showing a configuration of a CNT X-ray tube control system with a dummy load according to another embodiment of the present disclosure.

FIG. 4 is a view showing a configuration of a CNT X-ray tube control system with a dummy load according to another embodiment of the present disclosure.

Figure 5:
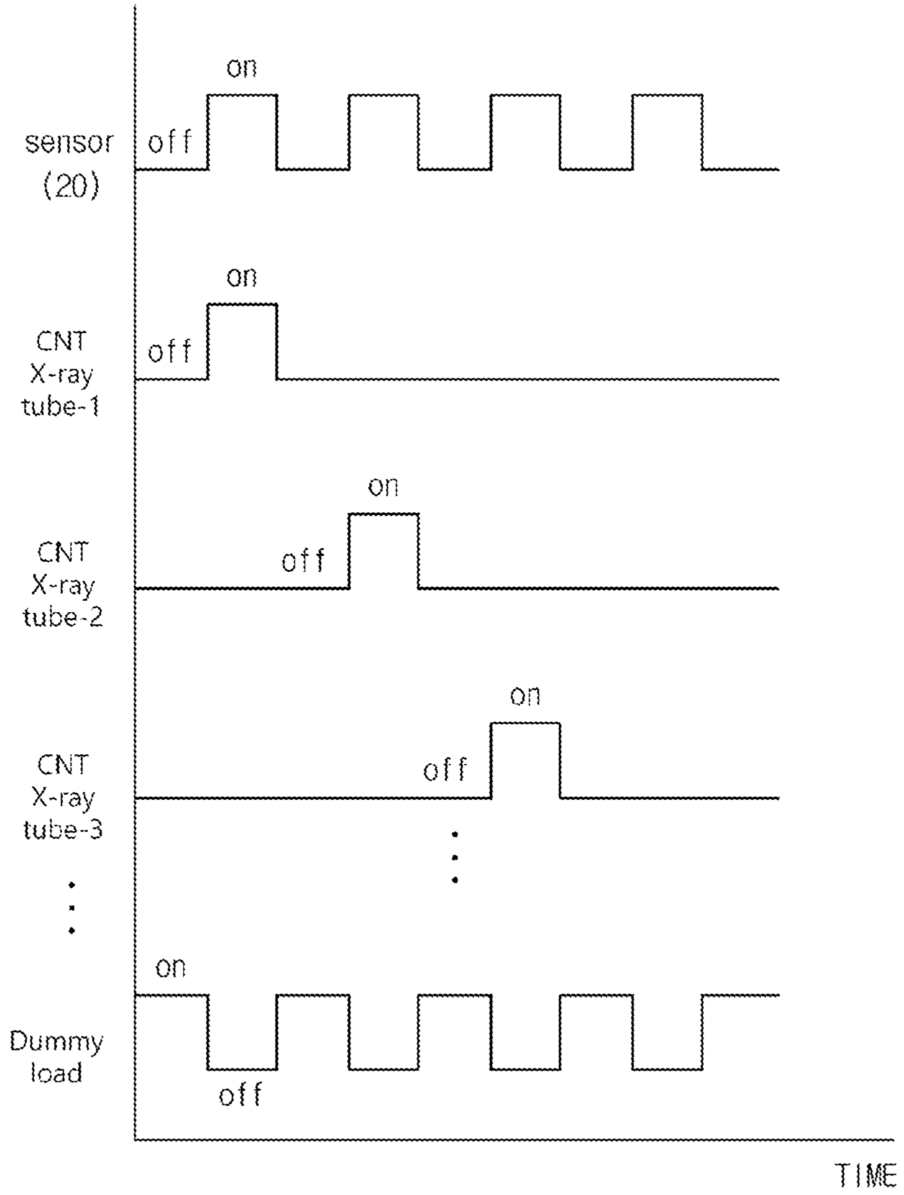
FIG. 5 is a view showing an operation time table of the CNT X-ray tube control system with the dummy load of FIG. 4.

FIG. 5 is a view showing an operation time table of the CNT X-ray tube control system with the dummy load of FIG. 4.

Referring to FIGS. 1 to 5, a CNT X-ray tube control system with a dummy load according to the present disclosure includes a CNT X-ray tube 100, a dummy load 200, a high-voltage part 300, and a controller 400.

The CNT X-ray tube 100 includes an anode electrode 110, a gate electrode 120, and a cathode electrode 130, and generates X-rays from electric field emission. More specifically, the cathode electrode 130 includes an electron emitter, and the anode electrode 110 includes an X-ray target surface. The gate electrode 120 may include a plane part and a focusing part. The plane part is in the form of a thin metal plate or metal mesh in which a plurality of holes are formed to allow electron beams to pass through. The focusing part has its perimeter that is connected to the plane part and extends in the longitudinal direction to form a focused electric field. However, no limitation to the configuration is imposed.

In order to operate the CNT X-ray tube 100, in general, a driving voltage of about 70 kV is applied to the anode electrode 110, a driving voltage of about 3 kV is applied to the gate electrode 120, and a driving voltage of 0 V is applied to the cathode electrode 130. When each voltage is applied to each electrode, electron beams are sufficiently accelerated and collide with the X-ray target surface of the anode electrode 110, thereby emitting X-rays.

The dummy load 200 includes an anode electrode 210, a gate electrode 220, and a cathode electrode 230. The dummy load 200 does not generate X-rays, and is connected to the CNT X-ray tube 100 in parallel. When X-rays are generated by operating the CNT X-ray tube 100, a high voltage is applied to the CNT X-ray tube 100, so the applied high voltage needs to be stabilized.

Due to voltage variation of the applied high voltage, errors in an X-ray image and image artifacts may occur. In addition, in order to secure the stability of a high voltage, it is essential to provide a costly power supply module and realize a high voltage power having stable constant voltage output, but this is an impossible design for an apparatus for reduction in size, such as the portable X-ray apparatus 10. To solve this, designed is a structure of connecting the dummy load 200 in parallel, the dummy load 200 serving as a resistor and being capable of minimizing the voltage variation of a high voltage applied when the CNT X-ray tube 100 is operated, and of achieving reduction in size.

The high-voltage part 300 controls a voltage applied to the CNT X-ray tube 100.

The high-voltage part 300 includes a first high-voltage part 310, a second high-voltage part 320, and a third high-voltage part 330.

The first high-voltage part 310 controls the voltage applied to the anode electrode 110 of the CNT X-ray tube.

The second high-voltage part 320 controls the voltage applied to the gate electrode 120 of the CNT X-ray tube.

The third high-voltage part 330 controls the voltage applied to a first current controller 140 and a second current controller 240.

The controller 400 controls the CNT X-ray tube 100, the dummy load 200, and the high-voltage part 300. More specifically, the ON/OFF operations of the CNT X-ray tube 100 and the dummy load 200 may be controlled to generate X-rays.

More specifically, the controller 400 may perform the following functions in order to operate the CNT X-ray tube 100: generating driving signals to apply driving signals of the voltage applied to the anode electrode 110 of the CNT X-ray tube, the voltage applied to the gate electrode 120 of the CNT X-ray tube, and the voltage applied to the cathode electrode 130 of the CNT X-ray tube; providing setting values for generating driving signals of the voltage applied to the anode electrode 110 of the CNT X-ray tube, the voltage applied to the gate electrode 120 of the CNT X-ray tube, and the voltage applied to the cathode electrode 130 of the CNT X-ray tube; and providing a switching signal for voltage conversion.

The controller 400 may include other additional configurations for performing the above-described functions to control the ON/OFF operations of the CNT X-ray tube 100 and the dummy load 200.

As an embodiment, the ON/OFF operation of the CNT X-ray tube 100 and the ON/OFF operation of the dummy load 200 may be performed complementarily to each other. Referring to FIG. 3, when a sensor 20 and the CNT X-ray tube 100 perform the ON operation, the dummy load 200 performs the OFF operation. When the sensor 20 and the CNT X-ray tube 100 perform the OFF operation, the dummy load 200 performs the ON operation. Accordingly, the CNT X-ray tube 100 and the dummy load 200 perform the ON/OFF operations complementarily to each other. The controller 400 may generate a driving signal such that the ON/OFF operation of the CNT X-ray tube 100 and the ON/OFF operation of the dummy load 200 are complementary to each other.

If there is no dummy load 200, the voltage of 70 kV (anode voltage) is applied to the CNT X-ray tube 100. In this case, when the current value flowing at this time is 1 mA, the load resistance for the CNT X-ray tube 100 is 70 MΩ. Herein, when the voltage is maintained and only the load resistance is made to enter an OFF state, the load resistance immediately becomes an equivalent load of several hundreds of MΩ and slowly converges to zero until the current does not flow. Considering this problem, the dummy load 200 having the same structure as the CNT X-ray tube 100 is connected to the CNT X-ray tube 100 in parallel to minimize rapid variation in load resistance, and in order to maintain the same value, the ON/OFF operation of the CNT X-ray tube 100 and the ON/OFF operation of the dummy load 200 are used alternately so as to be complementary to each other, thereby maintaining a uniform load.

The CNT X-ray tube 100 may include the first current controller 140 and the second current controller 240. The first current controller 140 is connected to the cathode electrode 130 of the CNT X-ray tube 100 to control the current applied to the cathode electrode 130 of the CNT X-ray tube 100. The second current controller 240 is connected to the cathode electrode 230 of the dummy load 200 to control the current applied to the cathode electrode 230 of the dummy load.

The first current controller 140 and the second current controller 240 may be controlled by the controller 400.

The first current controller 140 and the second current controller 240 may apply an active-current control (ACC) circuit. The active-current control (ACC) circuit is a method in which a control transistor is connected to a cathode node in series such that the control transistor directly controls a CNT current. A wide saturation region is secured in the output characteristics of the control transistor or circuit, so that stability and reliability can be greatly improved.

As an embodiment, a plurality of the CNT X-ray tubes 100 may be provided. As shown in FIG. 4, the plurality of the CNT X-ray tubes 100 may include a CNT X-ray tube-1 100-1~a CNT X-ray tube-N 100-N. The plurality of the CNT X-ray tubes 100-1~100-N and the dummy load 200 may be connected in parallel.

As an embodiment, the controller 400 may generate a switching operating frequency of the CNT X-ray tubes 100 and the dummy load 200, and may generate a switching PWM ratio.

As an embodiment, the controller 400 may divide the switching time of the plurality of the CNT X-ray tubes 100-1~100-N and the dummy load 200.

Referring to FIG. 5, the controller 400 may generate a switching operating frequency of the CNT X-ray tube-1 100-1, the CNT X-ray tube-2 100-2, the CNT X-ray tube-3 100-3, and the dummy load 200, and may generate a switching PWM ratio. Next, the switching time of the CNT X-ray tube-1 100-1, the CNT X-ray tube-2 100-2, and the CNT X-ray tube-3 100-3 may be divided. Through the division of the switching time, the CNT X-ray tube-1 100-1, the CNT X-ray tube-2 100-2, and the CNT X-ray tube-3 100-3 may perform the ON operations sequentially. That is, according to a PWM signal, the switching time is divided such that the CNT X-ray tube-1 100-1 performs the ON operation at the first clock, the CNT X-ray tube-2 100-2 performs the ON operation at the second clock, and the CNT X-ray tube-3 100-3 performs the ON operation at the third clock, that is, the ON operations are performed sequentially, one by one.

For processing into a 3D image rather than a 2D plane, in general, an X-ray source is physically rotated or moved to obtain several images and process the images, but by placing a plurality of the CNT X-ray tube 100 in advance at locations at which images are intended to be obtained, a plurality of images may be obtained at high speed without physical movement.

By using the dummy load 200 as in the present disclosure, voltage variation during the ON/OFF operation of a CNT X-ray tube can be minimized and a high voltage module reduced in size can be realized.

The scope of the present disclosure is not limited to the above-described embodiments, and may be realized in various embodiments within the scope of the claims. It is considered that the scope of the claims of the present disclosure includes various modifications that may be made to the present disclosure by any person skilled in the art to which the disclosure pertains, without departing from the gist of the present disclosure defined in the claims.

What is claimed is:

1. A CNT X-ray tube control system comprising:

a CNT X-ray tube comprising an anode electrode, a gate electrode, and a cathode electrode, and configured to generate X-rays from electric field emission;

a dummy load comprising an anode electrode, a gate electrode, and a cathode electrode, and configured not to generate X-rays, the dummy load being connected to the CNT X-ray tube in parallel;

a high-voltage part configured to control a voltage applied to the CNT X-ray tube; and a controller configured to control the CNT X-ray tube, the dummy load, and the high-voltage part, wherein a plurality of the CNT X-ray tubes are provided, the plurality of the CNT X-ray tubes and the dummy load are connected in parallel, and the controller is configured to generate a switching operating frequency of the plurality of the CNT X-ray tubes and the dummy load and generate a switching PWM ratio.

2. The system of claim 1, wherein an ON/OFF operation of the CNT X-ray tubes and an ON/OFF operation of the dummy load are performed complementarily to each other.

3. The system of claim 2, further comprising:

a first current controller connected to the cathode electrode of the CNT X-ray tubes, and configured to control a current applied to the cathode electrode of the CNT X-ray tubes; and a second current controller connected to the cathode electrode of the dummy load, and configured to control a current applied to the cathode electrode of the dummy load.

4. The system of claim 3, wherein the first current controller and the second current controller are configured to control the currents using an active-current control method.

5. The system of claim 1, wherein the controller is configured to divide switching time of the CNT X-ray tubes when the plurality of the CNT X-ray tubes are provided.

* * * * *